(12) United States Patent
Philipp (10) Patent No.: US 7,279,647 B2
(45) Date of Patent: Oct. 9, 2007

(54) CONTROL PANEL

(76) Inventor: Harald Philipp, 7 Cirrus Gardens, Hamble, Southampton (GB) SO31 4RH ( * ) Notice: Subject to any disclaimer, the term of this patent is extended or adjusted under 35 U.S.C. 154(b) by 0 days.

(21) Appl. No.: 11/424,900

(22) Filed: Jun. 19, 2006

(65) Prior Publication Data

US 2006/0284836 A1    Dec. 21, 2006

Related U.S. Application Data

(60) Provisional application No. 60/691,411, filed on Jun. 17, 2005.

(51) Int. Cl.
*H01H 9/00* (2006.01)
(52) U.S. Cl. .................... 200/5 R; 200/600; 345/160; 345/173
(58) Field of Classification Search ............... 200/5 R, 200/5 A, 18, 600, 511, 512, 516, 517; 341/22, 341/33–35; 345/156, 157, 160, 161, 168, 345/169, 173, 184
See application file for complete search history.

(56) References Cited

U.S. PATENT DOCUMENTS

| | | | |
|---|---|---|---|
| 4,110,749 A | | 8/1978 | Janko et al. |
| 4,264,903 A | | 4/1981 | Bigelow |
| 5,012,230 A | * | 4/1991 | Yasuda .................. 345/160 |
| 5,278,362 A | * | 1/1994 | Ohashi .................. 200/5 A |
| 5,666,113 A | * | 9/1997 | Logan .................. 341/34 |
| 5,914,702 A | * | 6/1999 | Derocher et al. ........... 345/157 |
| 6,198,475 B1 | * | 3/2001 | Kunimatsu et al. ......... 345/173 |
| 6,466,036 B1 | | 10/2002 | Philipp |
| 6,704,005 B2 | * | 3/2004 | Kato et al. .................. 345/173 |
| 6,756,969 B2 | * | 6/2004 | Nuovo et al. ............... 345/169 |
| 6,922,185 B2 | * | 7/2005 | Yamada et al. ............. 345/157 |
| 6,992,658 B2 | * | 1/2006 | Wu et al. .................. 345/169 |
| 7,046,229 B1 | * | 5/2006 | Drake ........................ 345/156 |
| 7,046,230 B2 | * | 5/2006 | Zadesky et al. ............ 345/156 |
| 7,119,291 B2 | * | 10/2006 | Sun ............................. 200/5 A |
| 7,136,051 B2 | * | 11/2006 | Hein et al. .................. 345/173 |

FOREIGN PATENT DOCUMENTS

| WO | WO2005/019766 A2 | 3/2005 |
|---|---|---|
| WO | WO2005/020056 A1 | 3/2005 |

* cited by examiner

*Primary Examiner*—Michael A Friedhofer
(74) *Attorney, Agent, or Firm*—David Kiewit (57) ABSTRACT

A control panel having a touch sensitive position sensor and at least one mechanical switch located within a sensitive area of the position sensor is provided. The position sensor comprises a capacitive position sensing element coupled to position sensing circuitry operable to determine the position of a capacitive load, such as a finger, positioned adjacent to the sensitive area of the position sensing element. The mechanical switch has an open state and a closed state and is arranged such that a contact of the switch is selectively electrically coupled to or decoupled from the position sensing element depending on whether the switch is in the open or closed state. A compact and robust control panel can thus be provided in which the presence of the mechanical switch within the sensitive area of the position sensor does not significantly effect its sensitivity.

14 Claims, 5 Drawing Sheets

CONTROL PANEL

BACKGROUND OF THE INVENTION

The invention relates to a control panel for controlling a device in response to a user's input, in particular the invention relates to a control panel having both touch sensitive and mechanical input means.

There is an increasing demand for compact and user friendly control panels for many devices, for example for devices such as portable media players and so forth. These devices are becoming smaller and are being provided with more functionality. To make best use of this increased functionality it is important that the control panel presented to the user (i.e. the user interface) is ergonomic, is simple and intuitive to use, and allows the user to quickly access the functions of the device. There is also a demand for control panels which are both aesthetically pleasing and robust.

It is known for control panels to include both touch sensitive inputs (e.g. capacitive position sensors) and mechanical inputs (e.g. conventional push buttons/ switches). For example, the "iPod mini" manufactured by Apple Computer Inc. has a touch sensitive scroll wheel overlaying a number of mechanical switches.

Figure 1A:
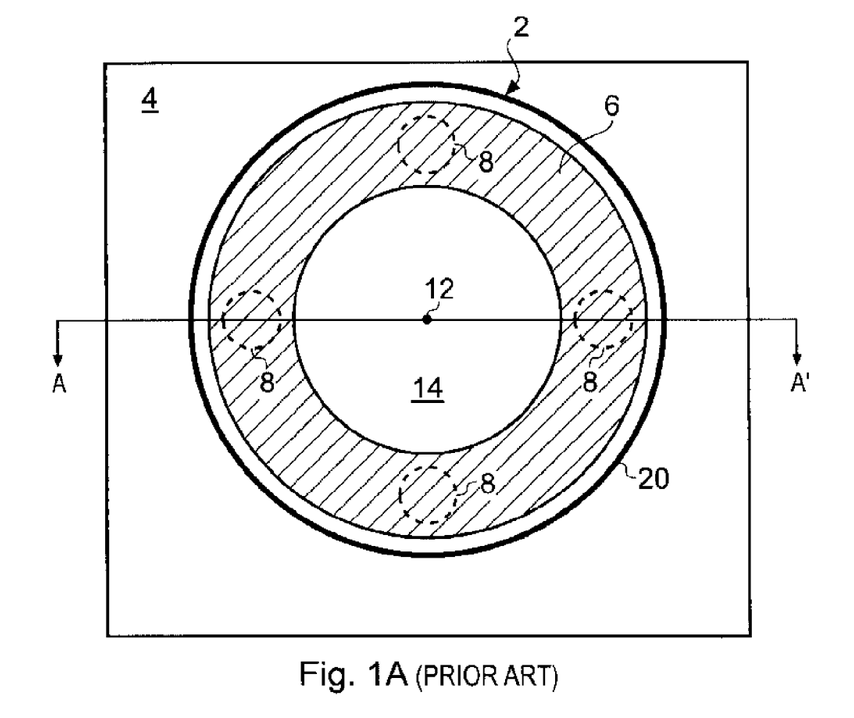
FIG. 1A schematically shows in plan view a known control panel.
Figure 1B:
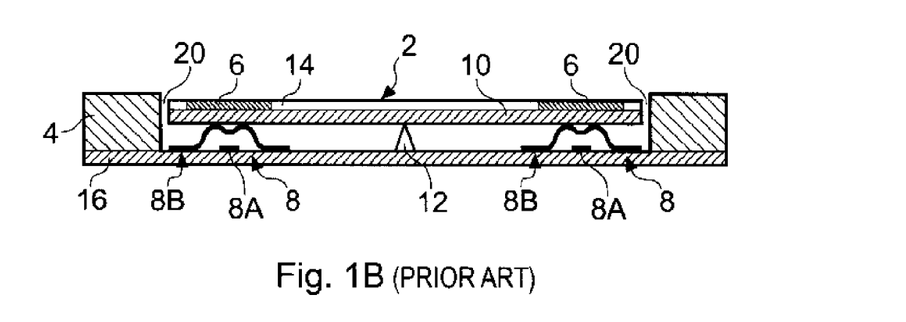
FIG. 1B schematically shows a section view through the control panel shown in FIG. 1A.

FIG. 1A schematically shows in plan view an example of this kind of control panel. FIG. 1B schematically shows a section view of the control panel shown in FIG. 1A taken along AA'. The control panel 2 is mounted in a wall 4 of a device to be controlled. The control panel includes a capacitive position sensing element 6 in the form of a ring and four conventional mechanical switches. These are coupled to appropriate control circuitry (not shown).

The capacitive position sensing element 6 is formed on a platform printed circuit board (PCB) 10. The platform PCB 10 and the capacitive position sensing element 6 are covered by an outer protective layer 14. The platform PCB 10 is tiltably mounted on a central support 12 so that it can move within an opening in the wall 4 of the device. The support 12 is attached to a base PCB 16. The base PCB 16 and the wall 4 are fixed together. The position of a user's finger touching the sensing element 6 is determined by the control circuitry and may be used to control the device.

The mechanical switches 8 are mounted on the base PCB 16 beneath the capacitive position sensing element 6. By mounting the mechanical switches behind the capacitive position sensing element instead of elsewhere on the device the footprint of the control panel is reduced. Each mechanical switch 8 comprises a deformable diaphragm 8B disposed over a central electrode 8A. Each diaphragm extends away from the base PCB 16 to a height at which it just touches the underside of the platform PCB 10. Switching action is achieved by deforming a selected diaphragm so that it contacts the central electrode 8A. This is done by pressing down on the capacitive position sensing element above the desired switch, This causes the platform PCB 10 to tilt about its central support 12 and compress the diaphragm of the selected switch to bring it into contact with its central electrode.

A user provides instructions through appropriate use of the capacitive position sensing element and the mechanical switches. For example, if the device is a portable music player and the user wishes to play a particular track stored on the device, the user might activate an appropriate one of the mechanical switches to display a listing of the tracks available, then run his finger around the capacitive position sensing element to scroll through the available tracks, and finally press another of the mechanical switches to start playback of the desired track.

Although the control panel 2 shown in FIGS. 1A and 1B provides a compact and intuitive user interface, it has a number of shortcomings. For example, there is a gap 20 between the platform PCB 10 and the wall 4. This means the interior of the device is not sealed. Accordingly, dirt and liquid may enter the device and cause damage. In addition, the mechanical nature of the tilting mechanism is prone to wear and possible eventual failure. Furthermore, because the entire platform PCB 10 is free to tilt about its support, switches can be activated by accident, e.g. by pressing midway between them (which furthermore might activate more than one switch). Accordingly, there is need for a control panel without these shortcomings.

SUMMARY OF THE INVENTION

According to a first aspect of the invention there is provided a control panel comprising: a capacitive position sensing element coupled to a position sensing circuit operable to determine the position of a capacitive load applied to the position sensing element; and at least one mechanical switch positioned within a sensitive area of the position sensing element, wherein the switch has an open state and a closed state and is arranged such that a switched contact of the switch is electrically coupled to the position sensing element when the switch is in the closed state and is electrically decoupled from the position sensing element when the switch is in the open state.

This allows for a compact control panel having a position sensor and one or more mechanical switches which occupy the same space and in which the position sensing element and the switch are mechanically independent of one another. Furthermore, the presence of the mechanical switch does not significantly affect the sensitivity of the position sensing element.

There are several ways in which circuitry for interpreting user inputs to the control panel can determine whether or not the switched contact is electrically coupled to the position sensing element (i.e. whether the switch has been activated).

For example, the switched contact may be electrically coupled to a system ground potential. This means when the switch is in the closed state (e.g. because it has been activated by a user), the position sensing element is coupled to ground via the mechanical switch at the location where the switched contact is coupled to the position sensing element. The position sensing circuit can be configured to respond to the associated decrease in impedance since it will be able to determine the position of an approaching object just prior to the impedance reduction, and then after noting the step reduction in impedance due to the activation of the mechanical switch, determine that the switch (and if there is more than one switch, which one of them) has been activated. This sequence for determining the location of a switch that has been activated is especially useful if the step impedance decrease at the location of the switch interferes with the ability to read position from the sensing element.

Alternatively, the control panel might comprise a capacitance electrically coupled to the switched contact. Thus, when the switch is in the closed state, the position sensing circuit 'sees' a step increase in the capacitance of the position sensing element at the position that the switched terminal is coupled to it. The position sensing circuit can be configured to respond to the associated increase in capacitance by first determining the position of an approaching object (e.g. finger) just prior to the observed step increase in capacitance due to the switch closure; in this way, if there is more than one switch, it can be determined which switch has been activated. If the step change in the capacitance of the position sensing element does not interfere with the position measurement, the step increase in capacitance can be noted and the position determined at the time the mechanical switch is activated, or at any time thereafter while it is still activate.

In another example, the control panel might further comprise a switch sensing circuit coupled to the switched contact with the position sensing circuit including drive circuit operable to apply drive signals to the capacitive position sensing element and with the switch sensing circuit being operable to determine whether the drive signals are present on the switched contact.

Thus, if the switch sensing circuit 'sees' the drive signals, this indicates that the mechanical switch is in the closed state. Alternatively, if the switched contact is at a floating potential, or is pulled up/down to a reference potential, the switch sensing circuit can determine that the switch is in the open state. Depending on the configuration of the mechanical switch, either a change from the open to the closed state or a change from the closed to the open state might be used to indicate that the switch has been activated by a user (i.e. the switch can be normally open or normally closed).

The capacitive position sensing element may comprise a plurality of sense electrodes with the position sensing circuit operable to measure a capacitance of each sense electrode to a system ground potential.

Alternatively, the position sensing element may comprise a continuous resistive sensing path with the position sensing circuit operable to determine a capacitance between the resistive sensing path and a system ground potential at a plurality of locations along the resistive sensing path, as described by the inventor in WO 2005/019766 A2.

Where the sensing element comprises a resistive sensing path, the switch may include a deformable diaphragm, e.g. made of rubber, and having a resistivity which is substantially the same as that of the resistive sensing path. This can help reduce any impact of the resistance of the switch on the sensitivity and accuracy of the position sensing element in its vicinity.

For a one-dimensional position sensing element, i.e. one operable to determine the position of a touch in a single sensing direction, which may be arranged to follow a straight or curved path which may also be open or closed (e.g. rotary), the mechanical switch may be arranged to have a greater extent in a direction orthogonal to the sensing direction than in a direction along the sensing direction. This too can help reduce any impact of the switch on the sensitivity of the position sensing element in the vicinity of the switch.

The control panel may further comprise a substrate wherein the position sensing element and the mechanical switch are both mounted on the substrate. By providing the position sensing element and the mechanical switch with a common base, a simple and robust assembly is provided.

The control panel might further comprise a surface panel overlaying the position sensing element with an opening through which the mechanical switch passes. Furthermore, the control panel may additionally comprise a protective flexible membrane overlaying the surface panel. This provides for a control panel having an outer surface which is in effect sealed but still allows for activation of the mechanical switch. Thus the interior of a device being controlled and the control panel itself are protected from possible damage from dirt or liquid ingress into the device.

The mechanical switch(es) might comprises a deformable diaphragm, e.g. made of rubber, plastics or metal, at least a part of which is electrically conductive, overlaying the switched contact and wherein the switch is operable to be changed between the open state and the closed state by pushing on the deformable diaphragm. This provides for a simple and reliable mechanical switch that provides a user with good tactile feedback. Furthermore, the conductive diaphragm can help to 'mask' the mechanical switch and so reduce the impact of the switch on the sensitivity of the position sensing element. A tact switch having a mechanical actuator post made of plastic could also be used, which would provide minimal interference with the capacitive sensing fields of the position sensing element at the expense of greater required control surface thickness.

The position sensing element can be arranged along any desirable path, for example, a closed path such as a circle (annulus) or an open path such as a line (curve). Similarly, the mechanical switch(es) can be positioned at locations along the position sensing element as desired. Furthermore, the control panel might be provided with additional mechanical or touch sensitive switches outside of the sensitive area of the position sensing element. For example, a switch within (e.g. central to) a position sensing element having a closed sensing path might be provided.

According to a second aspect of the invention there is provided a device having a control panel comprising: a capacitive position sensing element coupled to a position sensing circuit operable to determine the position of a capacitive load applied to the position sensing element; and at least one mechanical switch positioned within a sensitive area of the position sensing element, wherein the switch has an open state and a closed state and is arranged such that a switched contact of the switch is electrically coupled to the position sensing element when the switch is in the closed state and is electrically decoupled from the position sensing element when the switch is in the open state.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 2A:
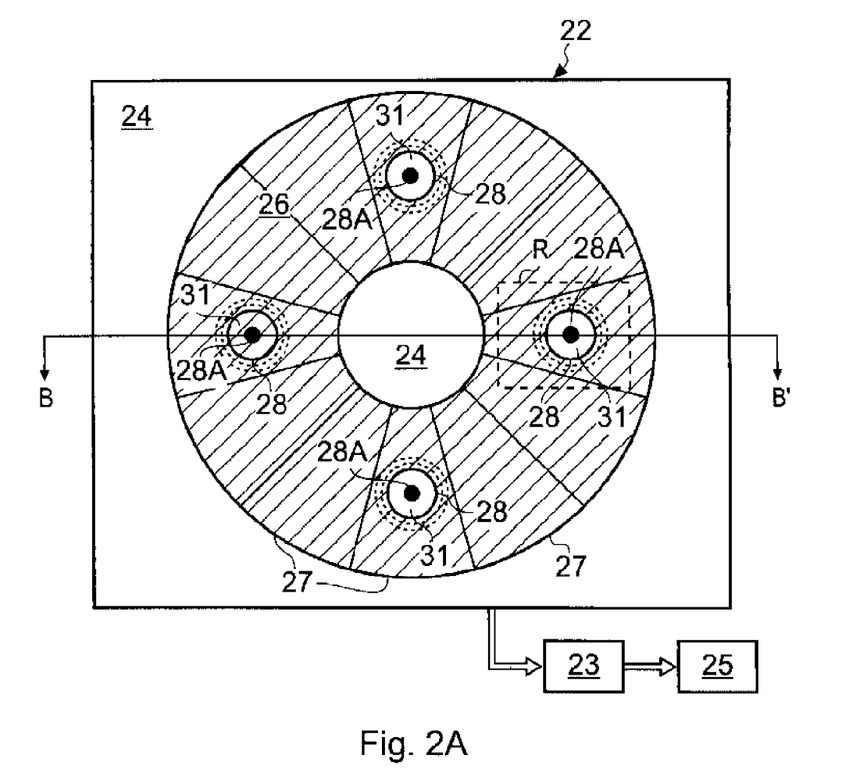
FIG. 2A schematically shows in plan view a control panel according to an embodiment of the invention.
Figure 2B:
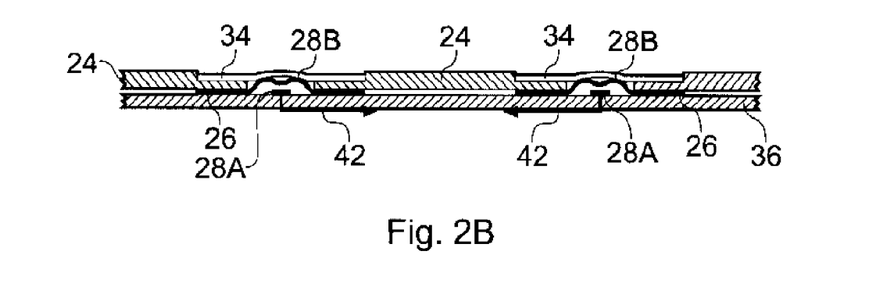
FIG. 2B schematically shows a section view through the control panel shown in FIG. 2A.
Figure 3A:
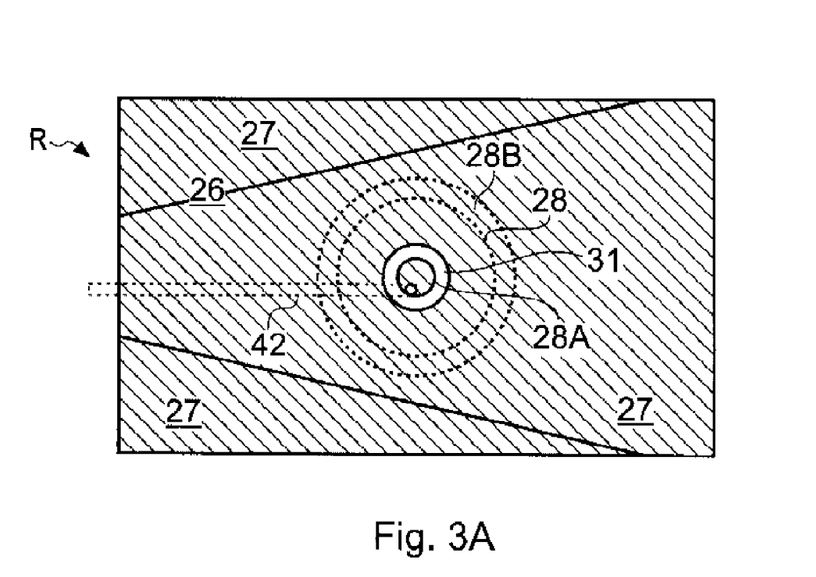
FIGS. 3A and 3B respectively show portions of the control panel shown in FIGS. 2A and 2B on a larger scale.
Figure 3B:
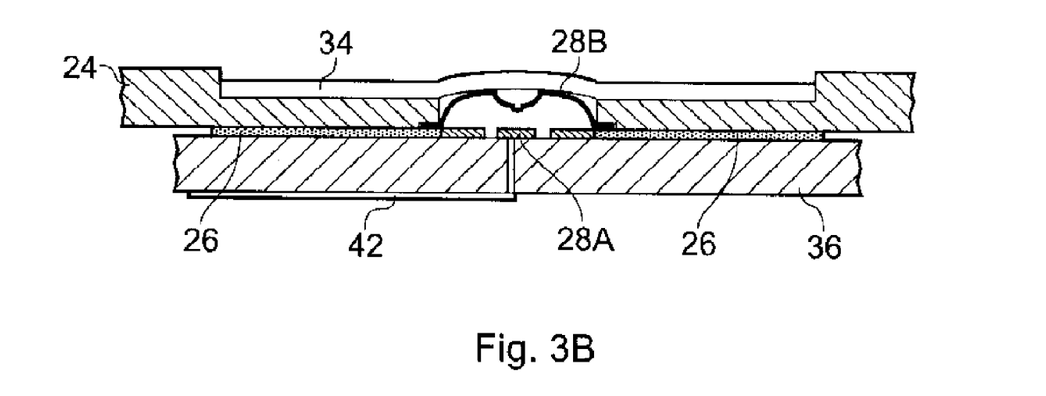

FIG. 2A schematically shows in plan view a control panel 22 for controlling a device, e.g. a portable music player, according to an embodiment of the invention. FIG. 2B schematically shows a section view of the control panel 22 taken along BB'. For the orientation shown in FIG. 2B, the control panel is operated from above. FIGS. 3A and 3B respectively show plan and section views of a region of the control panel 22 identified by a dashed line R in FIG. 2A on a larger scale.

The control panel 22 has an overall level of functionality which is similar to the control panel 2 shown in FIGS. 1A and 1B in that it includes a position sensing element 26 in the form of a ring and four mechanical switches 28 (in this case dome-type push buttons).

The control panel 22 comprises a PCB substrate 36 carrying the position sensing element 26 and the mechanical switches 28, a surface panel 24 overlaying the substrate 36, and an outer protective flexible membrane 34. In this example, the plastic surface panel 24 is integrally formed in a wall of the device. The control panel 22 is connected to interpreter circuitry 23 which is operable to interpret the status of the control panel (i.e. whether, and in what way, a user input is interacting with it), and to provide corresponding control signals to a controller 25 of the device. The controller 25 can then govern the functioning of the device in accordance with the user's input.

The position sensing element 26 in this example is in the form of an annulus and comprises twelve separate areas 27 of conductive material (e.g. copper) deposited on the substrate 36. Four of the conductive areas have circular open regions 31 within which there is no conductive material. These open regions 31 correspond to the positions of the four mechanical switches. Within each open region 31 is a central electrode 28A which acts as a switched contact (terminal) of the corresponding mechanical switch. An electrical connection 42 passes from each central electrode through the substrate 36 to allow the switched terminal to be connected to additional circuitry (which might be sensing circuitry or simply a connection to a system reference potential or to a capacitance). The open regions 31 may be made small (i.e. only slightly larger than the central electrode). The patterning of the conductive areas 27 comprising the position sensing element 26 and the central electrodes 28A can be created using conventional PCB etching techniques, for example.

The interpreter circuitry comprises position sensing circuitry operable to determine a capacitance distribution within a sensitive area of the position sensing element. The position sensing circuitry comprises a series of channels of capacitance measurement circuitry and position calculation circuitry. Each conductive area 27 is coupled to one of the channels of capacitance measurement circuitry; in some cases the connections may be repeated as shown in FIG. 7 of U.S. Pat. No. 4,110,749, for example. In this example a series of separate channels is used, but a single channel with appropriate multiplexing could also be used. The capacitance measurement circuitry is configured to measure the capacitance of each of the respective conductive areas 27 to a system ground or other common reference potential. Capacitance measurement circuitry of the charge-transfer kind described in the inventor's U.S. Pat. No. 6,466,036 may be used, for example.

An object, such as a user's finger or a stylus, in the vicinity of the position sensing element 26 affects the capacitance of each of the conductive areas differently depending on the position of the object within the sensitive area (i.e. around the ring). The position calculation circuitry receives measurements of the capacitance to ground of the respective conductive areas from the capacitance measurement circuitry, and from the changes in capacitance caused by the presence of the object is able to determine where on the ring the object is positioned. A control signal representing this position is reported to the device controller which takes appropriate action to control the device. The appropriate action will depend on the nature and operating software of the device being controlled. For example, the controller may be configured to scroll through a list displayed to a user in response to changes in the control signal provided by the interpreter circuitry. Changes in the control signal would indicate, for example, that a user is moving his finger around the capacitive position sensing element in one direction or the other.

The positional resolution of this type of sensing element can be significantly better than simply the number of separate conductive areas by using inherent interpolation provided by the different capacitive coupling of a user's finger to adjacent areas.

Each of the four mechanical switches 28 comprises a deformable conductive diaphragm 28B disposed over a respective one of the central electrodes 28A. In this example the diaphragm is made of rubber, but it could equally be metallic or a suitably conductive (e.g. due to a coating) plastic. As noted above, the central electrodes 28A act as switched contacts for the mechanical switches. A peripheral rim of the conductive diaphragm 28B associated with each mechanical switch contacts the conductive area 27 surrounding the central electrode 28A with which it is associated. When the diaphragm 28B is in a relaxed state (i.e. no deforming force applied) it does not contact the central electrode 28A and the switch is in an open state.

The surface panel 24 has four through holes. These are sized and positioned to receive respective ones of the diaphragms 28B. Except for these holes, the surface panel 24 extends continuously over all of the substrate 36. When assembled, the substrate 36 is held against the surface panel 24 (although is slightly offset due to the thickness of the conductive areas 27). The outer face of the surface panel 24 (i.e. the uppermost surface for the orientation shown in FIGS. 2B and 3B) has a recess in the form of a depression aligned with the underlying position sensing element 26. This recess helps to guide a user's finger when moving around the surface panel 24 above the sensitive area of the capacitive position sensing element 26. The underside of the surface panel (i.e. the lowermost surface for the orientation shown in FIGS. 2B and 3B) includes a shoulder recess around each of the through holes. The shoulder recesses accommodate the peripheral rims of the respective diaphragms 28B, and clamp them to the corresponding conductive areas 27. Alternatively, the through holes in the surface panel might be larger than the peripheral rim of the diaphragms with the diaphragms attached to their respective conductive areas 27 using a conductive adhesive, for example.

The diaphragms 28B each extend through their respective holes in the surface panel 24 so as to protrude above it. The flexible protective membrane 34 is in the form of a ring and is attached to the surface panel 24 within the recess in its upper surface so as to overlay the protruding diaphragms. The surface panel 24 and the protective membrane 34 thus combine to form a continuous surface overlaying the substrate 24, the capacitive sensing element 26 and the mechanical switches 28. Thus the interior of the controlled device is well sealed against possible dirt and liquid ingress.

Switching action is achieved by a user pressing above the appropriate diaphragm 28B to compress it sufficiently to bring it into contact with its central electrode 28A, thus placing the switch in a closed state. This is done by pressing down on the flexible protective membrane 34 at the appropriate place. The flexible protective membrane 34 may be marked to show the positions and corresponding functions of the mechanical switches. In addition the mechanical switches may be sized so as to raise the membrane over the switches above the surrounding level so that the positions of the mechanical buttons may be felt by a user without looking at the control panel. Activating a chosen switch has the effect of establishing an electrical connection between the central electrode 28A (switched contact) and its surrounding conductive area 27 through the conductive diaphragm 28B. The interpreter circuitry is configured to respond to this by sending an appropriate control signal to the controller so that it can take appropriate action to control the device. There are several ways in which the interpreter circuitry can be configured to sense that a switch has been pressed (activated).

In this example, each of the central electrodes is coupled (in this case by direct connection) to a system reference potential, in this case ground, via the electrical connections 42. Thus when a switch is activated the capacitance measurement circuitry initially sees an increase in capacitance as the user's finger approaches the position sensing element and then a step signal change as the corresponding conductive area is shorted to ground through the mechanical switch. The step change can appear as a sudden decrease or increase in apparent measured capacitance depending on the interpreter circuitry used, despite the fact that the step change is non-capacitive in nature. The interpreter circuitry can be configured to recognize this response and provide an appropriate control signal to the device controller to indicate that the switch associated with the adjacent conductive area displaying the response has been activated; for instance, the circuitry can note the last valid position of an object (e.g. finger) location just prior to detecting the step change in signal. Or, the circuitry could simply sense which of the conductive areas 27 is connected to ground.

Alternatively, each of the central electrodes 28A could be coupled to a capacitor (either to separate capacitors or a single common capacitor). By using a capacitor, when a switch is activated the capacitance measurement circuitry coupled to the corresponding conductive area of the position sensing element sees the additional capacitance of the capacitor at the location of the switch. By selecting the capacitor to have a capacitance that is notably greater from that associated with a typical user's touch or other object to be sensed, the sudden step rise in capacitance of a conductive area coupled to an activated switch can be identified. Thus a user's activation of a mechanical switch can be readily distinguished from a mere positioning of their finger over the position sensing element in the vicinity of the switch.

In other examples the interpreter circuitry might include additional switch sensing circuitry to determine whether, and if so which, mechanical switch has been activated. For example, the charge-transfer circuitry used in this case for the capacitance measurement circuitry includes drive circuitry configured to apply drive signals to respective ones of the conductive areas. Accordingly, when a particular switch is activated, the drive signals applied to the surrounding conductive area 27 are also applied to the central electrode through the conductive diaphragm 28B. By connecting the central electrodes 28A to switch sensing circuitry in the interpreter circuitry, activation of a switch can be identified and appropriate control signals provided to the device controller. For example, the switch sensing circuitry can be configured to note a change from a floating or fixed potential to the applied drive signal. (It is noted that in some configurations the switch will normally be in a closed state and be moved to an open state on activation. In this case, switch activation can be identified by a change from the applied drive signal to a floating or fixed potential being present on the switched contact.) The switch closure need only change the state of the signal on electrical connection 42 in a detectable manner. Accordingly the 'fixed potential' in the above discussion could be a ground reference, a power supply reference, or any other voltage reference imposed on electrical connection 42 via a resistor, for example. It will be appreciated that when using other types of capacitance measurement circuitry that apply drive signals to the position sensing element the same technique may be employed.

The control panel shown in FIGS. 2A, 2B, 3A and 3B thus allows mechanical switches to be provided within the touch sensitive area of a capacitive positioning sensing element to provide a compact control panel. The control panel does not include any moving parts (other than those associated with the mechanical push switches themselves) and so is less prone to wear. Furthermore, the control panel has a continuous sealed outer surface which helps prevent liquids and dirt from entering the interior of the device. In addition, because the mechanism for activating each of the mechanical switches is independent of the capacitive position sensing element (i.e. it does not rely on movement of the position sensing element), there is no risk of activating one or more of the switches by accidentally pressing too hard on the capacitive position sensing element away from the positions of the switches. The control panel also appears more robust to a user since when pressed away from the mechanical switches, there is no mechanical movement.

Because the conductive diaphragms 28B are in electrical contact with the conductive areas 27 of the position sensing element 26 and overlay the open regions 31, the sensitivity of the capacitive position sensing element 26 in the vicinity of the mechanical switches is not significantly effected. This is because a capacitive load adjacent the position sensing element in the vicinity of the mechanical switches can be electrically coupled to the capacitance measurement circuitry through the conducting diaphragms (i.e. the diaphragms act as extensions of the position sensing element).

It will be understood that many other forms of mechanical push switch could be used which need not be of the deformable conductive rubber type. For example a deformable non-conducting diaphragm having a separate conductive element could be used whereby the separate conductive element is arranged to connect directly between the central electrode (switched contact) and its neighboring conductive area when the diaphragm is compressed. In this case, because the diaphragm is not conducting over its whole surface there may be a small change in the sensitivity of the position sensing element in the vicinity of the mechanical switches. This can be mitigated by having only a small open region 31 in the conductive areas surrounding the central electrodes. The extent of the open regions need only be sufficient to ensure that central electrode 28A is electrically isolated form the conductive area when the switch is in its open state.

Figure 4:
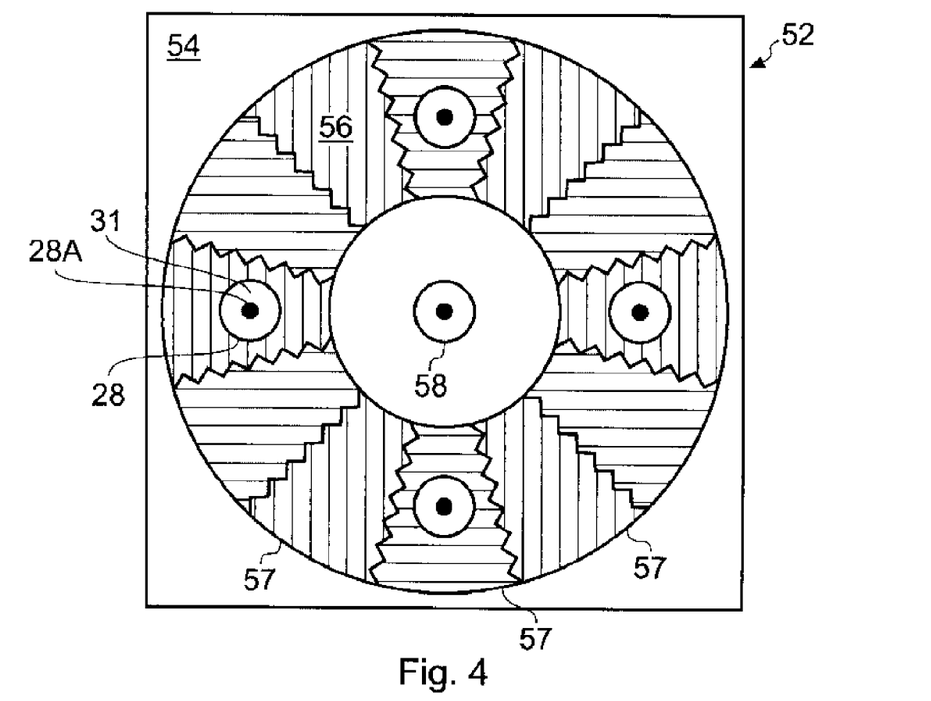
FIG. 4 schematically shows in plan view part of a control panel according to another embodiment of the invention.

FIG. 4 schematically shows in plan view a control panel 52 according to another embodiment of the invention. Features of the control panel 52 shown in FIG. 4 which are similar to and will be understood from the corresponding features of the control panel 22 shown in FIG. 2A are identified by the same reference numerals. However, the control panel 52 has a capacitive position sensing element 56 which is different to that shown in FIG. 2A. In particular, the different conductive areas 57 comprising the capacitive position sensing element 56 are shaped to have a toothed (i.e. serrated or "zigzag") boundary between each other. This has the effect of improving the response of the position sensing element when a user's touch is made in the vicinity of the interface between two conductive areas, for example as described with reference to FIG. 5 of U.S. Pat. No. 4,264,903.

The control panel 52 shown in FIG. 4 also includes an additional mechanical push switch 58 positioned towards the centre of the annular position sensing element 56. A surface panel 54 of the control panel 52 is similar to that shown in FIG. 2A, but includes an additional through hole for receiving the additional mechanical push switch 58. The additional mechanical push switch can be any conventional mechanical switch. This increases the number of different input commands that a user can enter without increasing the overall size of the control panel. A touch sensitive, rather than mechanical, switch could also be used at this location.

Figure 5:
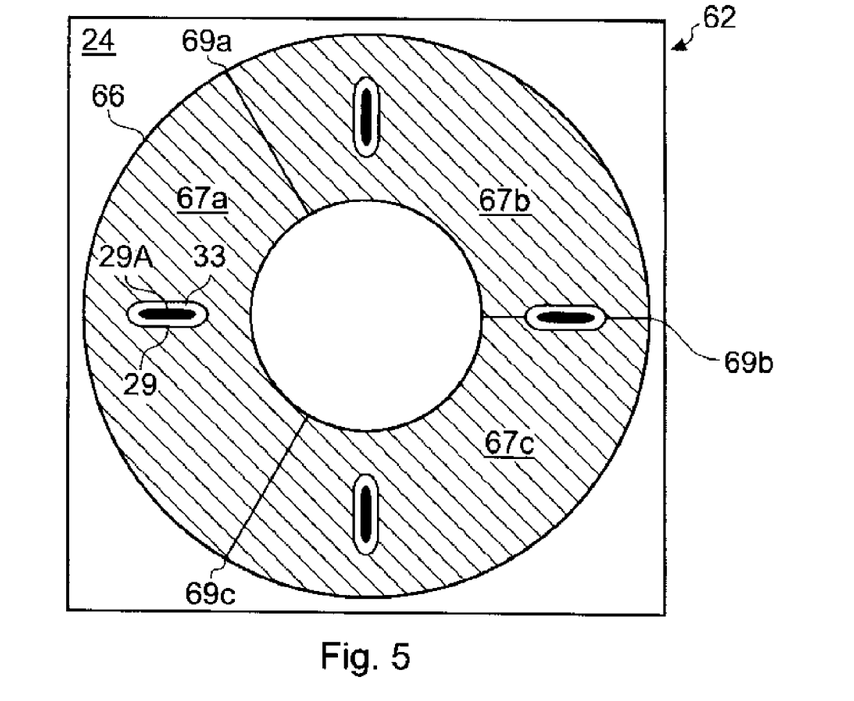
FIG. 5 schematically shows in plan view part of a control panel according to another embodiment of the invention.

FIG. 5 schematically shows in plan view a control panel 62 according to another embodiment of the invention. Features of the control panel 62 shown in FIG. 5 which are similar to and will be understood from the corresponding features of the control panels 22, 52 shown in FIGS. 2A and 4 are identified by the same reference numerals. However, the control panel 62 shown in FIG. 5 employs a capacitive position sensing element 66 which is different to those shown in FIGS. 2A and 4 and mechanical switches 29 which are non-circular.

Instead of a series of conductive areas, the position sensing element shown in FIG. 5 includes a continuous ring of a resistive material deposited on the substrate. The ring of resistive material is divided into three sections 67A-C by three equiangularly spaced electrodes 69A-C. Each electrode is connected to a channel of capacitance measurement circuitry within the control panel's interpreter circuitry. The position of a touch over the position sensing element can be determined from a comparison of the capacitances measured at each terminal as described by the inventor in WO 2005/019766 A2. This approach has the benefit of requiring fewer capacitance measurement channels than are used with the control panels shown in FIGS. 2A and 4. It will be understood that the continuous ring of a resistive material could be replaced with a series of discrete resistors connecting between extended electrodes, again as described by the inventor in WO 2005/019766 A2.

The mechanical switches 29 shown in FIG. 5 are similar to those of FIGS. 2 to 4 in that they include a central electrode 29A within an open region 33. However, the mechanical switches are elongate rather than circular. This is because for the embodiment shown in FIG. 5, the presence of the mechanical switches 29 within the sensitive area of the position sensing element can have a more significant effect on the response than in other cases. This is due to the resistivity of the material comprising the position sensing element playing a role in identifying the position of a touch. This effect can be reduced by providing mechanical switches which have a limited angular extent as shown in FIG. 5. By using elongate switches in this way, the switches can be made sufficiently large to be readily pressed by a user, while also having only a small extent in the direction along which position is measured (i.e. azimuthally for an annular position sensing element). The effect of the mechanical switches can also be reduced by ensuring that their diaphragms have a resistivity similar to that of the position sensing element.

It will be understood than other configurations of control panel having different arrangements of positioning sensing element and mechanical switches can be constructed according to the same principles.

Figure 6A:
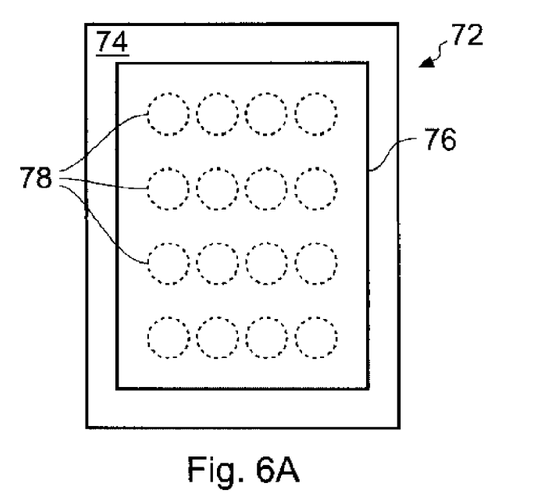
FIG. 6A-6C schematically shows in plan view part of a control panel according to other embodiments of the invention.

FIG. 6A schematically shows in plan view a control panel 72 according to another embodiment of the invention. The control panel includes a surface panel 74 which is similar to and will be understood from the surface panels of FIGS. 2 to 5. However, the control panel 72 shown in FIG. 6A is based on a two-dimensional position sensing element 76, rather than a one dimensional position sensing element in the form of a ring as shown in FIGS. 2 to 5. The two dimensional position sensing element in this case comprises an array of discrete conducting areas (not shown) and operates on a principle similar to that described above for the one dimensional position sensing element shown in FIG. 2, although extended to two dimensions. The control panel 72 includes an array of sixteen mechanical switches 78 within the sensing area of the position sensing element 76. These may function in the same way as the mechanical switches previously described. The position sensing element 76 in this case comprises sixteen discrete conductive areas with a mechanical switch within each one. Two dimensional position sensors based on continuous resistive sensing elements, such as described by the inventor in WO 2005/020056 A1, may also be used in a manner analogous to that described above for the one-dimensional position sensing element shown in FIG. 5.

Figure 6B:
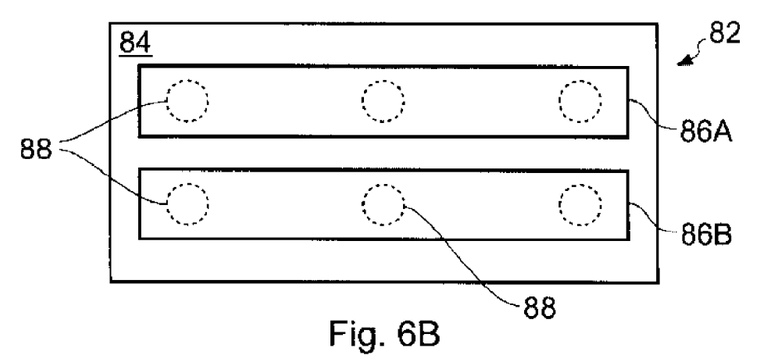

FIG. 6B schematically shows in plan view a control panel 82 according to yet another embodiment of the invention. The control panel includes a surface panel 84 which is similar to and will be understood from the surface panels of FIGS. 2 to 5. The control panel 82 shown in FIG. 6B however includes two one-dimensional position sensing elements 86A, 86B, each arranged along a straight path. Each of the two position sensing elements have three mechanical switches 88 within their sensitive area. The position sensing elements 86A, 86B and the mechanical switches 88 can operate according to the same principles as described above.

Figure 6C:
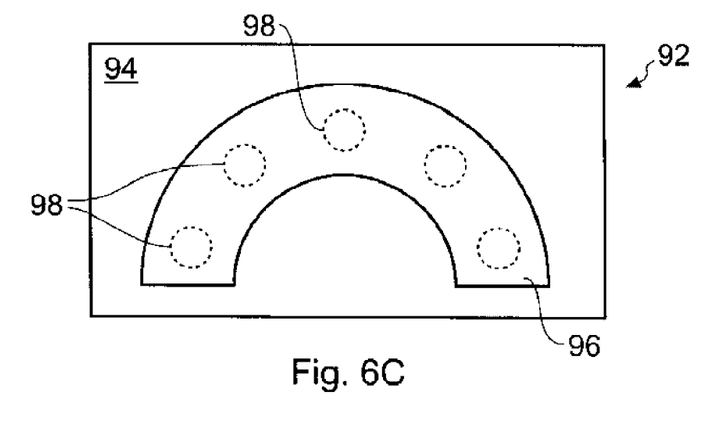

FIG. 6C schematically shows in plan view a control panel 92 according to yet another embodiment of the invention. The control panel includes a surface panel 94 which is similar to and will be understood from the surface panels of FIGS. 2 to 5. The control panel 92 shown in FIG. 6C however a one-dimensional position sensing elements 96 arranged along a semi-circular path. The position sensing element includes five mechanical switches 98 within its sensitive area. Again, the position sensing element 96 and the mechanical switches 98 can operate according to the same principles as described above.

In general, one or more capacitive positioning sensing elements having sensitive areas arranged along any path, closed or open, or two-dimensional area can be used with any number of mechanical switches at any locations as desired. Furthermore, the control panel need not be flat, but may be contoured, e.g. in the form of a simple or complex curve, so as to provide a shaped outer surface, e.g. to follow the lines of a device to be controlled.

It will be understood that other types of mechanical (pressure actuated) switch can be used, such as 'tact' switches as is well known in the art. In the above description, the term 'diaphragm' should be interpreted to mean any type of switch of any composition without limitation, for example metal dome switches, conductive rubber domes, conductive plastic domes, tact buttons, membrane buttons, or other electromechanical switching devices, with or without tactile feedback.

It will also be understood that any form of capacitance measurement circuitry may be employed. However, as noted above a preferred capacitance measurement circuit is of the charge-transfer kind described in U.S. Pat. No. 6,466,036. This type of circuitry provides for a reliable and robust measure of the typical capacitances that might be expected in a given implementation of the invention.

It will also be understood that similar benefits may be achieved by having mechanical switches arranged beneath a position sensing element which is arranged on a flexible substrate, rather than a rigid PCB. This allows the mechanical switches to be activated without requiring an opening in the wall of a device or a pivot to accommodate movement of a rigid substrate supporting the position sensing element. However, this is less preferable because the flexible substrate supporting the position sensing element will be prone to deterioration through prolonged use.

Finally, it is noted that although the term "touch" is frequently used in the above description, a position sensing element can be sufficiently sensitive that it is able to register the location of an adjacent finger (or other object such as a stylus) without requiring physical contact. The term "touch" as used herein should therefore be interpreted accordingly.

What is claimed is:

1. A control panel comprising:
   a capacitive position sensing element arranged on a surface of the substrate and coupled to a position sensing circuit operable to determine the position of a capacitive load applied to the position sensing element; and
   at least one mechanical switch positioned on the surface of the substrate within a sensitive area of the position sensing element, wherein the switch has an open state and a closed state and is arranged such that a switched contact of the switch is electrically coupled to the position sensing element when the switch is in the closed state and is electrically decoupled from the position sensing element when the switch is in the open state.

2. The control panel of claim 1, wherein the switched contact is electrically coupled to a system ground potential.

3. The control panel of claim 1, further comprising a capacitor wherein the switched contact is electrically coupled to the capacitor.

4. The control panel of claim 1, further comprising a switch sensing circuit coupled to the switched contact and wherein the position sensing circuit includes a drive circuit operable to apply drive signals to the capacitive position sensing element, the switch sensing circuit being operable to determine whether the drive signals are applied to the switched contact.

5. The control panel of claim 1, wherein the capacitive position sensing element comprises a plurality of sense electrodes and the position sensing circuit is operable to measure a capacitance of each sense electrode to a system ground potential.

6. The control panel of claim 1, wherein the capacitive position sensing element comprises a continuous resistive sensing path and wherein the position sensing circuit is operable to determine a capacitance between the resistive sensing path and a system ground potential at a plurality of locations along the resistive sensing path.

7. The control panel of claim 6, wherein the switch comprises a deformable diaphragm having a resistivity substantially the same as that of the resistive sensing path.

8. The control panel of claim 1, wherein the position sensing element is operable to determine the position of an object in a sensing direction and wherein the mechanical switch has a greater extent in a direction orthogonal to the sensing direction than in a direction along the sensing direction.

9. The control panel of claim 1, further comprising a surface panel overlaying the position sensing element, wherein the surface panel has a wall defining an opening through which the mechanical switch passes.

10. The control panel of claim 9, further comprising a protective flexible membrane overlaying the surface panel.

11. The control panel of claim 1, wherein the mechanical switch comprises a deformable diaphragm overlaying the switched contact, and wherein the switch is operable to be changed between the open state and the closed state by pushing on the deformable diaphragm.

12. The control panel of claim 1, wherein the position sensing element is arranged around a closed path.

13. The control panel of claim 1, wherein the position sensing circuit comprises a charge transfer capacitance measurement circuit.

14. A device having a control panel comprising:
   a capacitive position sensing element arranged on a surface of the substrate and coupled to a position sensing circuit operable to determine the position of a capacitive load applied to the position sensing element; and
   at least one mechanical switch positioned on the surface of the substrate within a sensitive area of the position sensing element, wherein the switch has an open state and a closed state and is arranged such that a switched contact of the switch is electrically coupled to the position sensing element when the switch is in the closed state and is electrically decoupled from the position sensing element when the switch is in the open state.

* * * * *